US012574570B2

(12) United States Patent
Zhang et al.

(10) Patent No.: US 12,574,570 B2
(45) Date of Patent: Mar. 10, 2026

(54) METHOD AND APPARATUS FOR GENERATING LIVE-STREAMING CONTENT

(71) Applicant: Hangzhou AliCloud Feitian Information Technology Co., Ltd., Hangzhou City (CN)

(72) Inventors: Yuxin Zhang, Hangzhou (CN); Lin Rui, Hangzhou (CN)

(73) Assignee: Hangzhou AliCloud Feitian Information Technology Co., Ltd. (CN)

( * ) Notice: Subject to any disclaimer, the term of this patent is extended or adjusted under 35 U.S.C. 154(b) by 0 days.

(21) Appl. No.: 18/685,211

(22) PCT Filed: Jan. 13, 2023

(86) PCT No.: PCT/CN2023/072112
§ 371 (c)(1),
(2) Date: Feb. 20, 2024

(87) PCT Pub. No.: WO2023/138508
PCT Pub. Date: Jul. 27, 2023

(65) Prior Publication Data
US 2025/0142138 A1 May 1, 2025

(30) Foreign Application Priority Data

Jan. 24, 2022 (CN) .......................... 202210078888.5

(51) Int. Cl.
*H04N 21/2187* (2011.01)
*G06T 17/00* (2006.01)
*H04N 21/475* (2011.01)

(52) U.S. Cl.
CPC ......... *H04N 21/2187* (2013.01); *G06T 17/00* (2013.01); *H04N 21/4758* (2013.01)

(58) Field of Classification Search
CPC ........... H04N 21/2187; H04N 21/4758; H04N 21/475; H04N 21/26283; H04N 21/4788;
(Continued)

(56) References Cited

U.S. PATENT DOCUMENTS 10,026,229 B1 * 7/2018 Yalniz ....................... G06T 7/74
10,037,767 B1 * 7/2018 Nichkawde ........... G06F 40/205
(Continued)

FOREIGN PATENT DOCUMENTS

CN 108897848 A 11/2018
CN 109271509 A 1/2019
(Continued)

OTHER PUBLICATIONS

China National Intellectual Property Adminstration; International Search Report and Written Opinion issued in PCT App. No. PCT/CN2023/072112 dated Apr. 28, 2023; 15 pages.
(Continued)

*Primary Examiner* — Sahar Aqil Riaz
(74) *Attorney, Agent, or Firm* — MASCHOFF BRENNAN

(57) ABSTRACT

An embodiment of the present application provides a method and an apparatus for generating live-streaming content, where the method for generating live-streaming content includes: using a virtual character to carry out a live-streaming for a live-streaming theme, where the live-streaming theme corresponds to a live-streaming theme text with a first narrative style; driving the virtual character to broadcast the live-streaming theme text in a first broadcasting style; prompting a viewing user of theme interaction information related to the live-streaming theme through the virtual character; acquiring multiple pieces of theme feedback information related to the theme interaction information of the viewing user; generating at least one target keyword
(Continued)

based on the multiple pieces of theme feedback information; acquiring a live-streaming interactive text with a second narrative style associated with the at least one target keyword; and driving the virtual character to broadcast the live-streaming interactive text in a second broadcasting style.

20 Claims, 6 Drawing Sheets

(58) Field of Classification Search
CPC ............. H04N 21/488; H04N 21/8126; H04N 21/8146; H04N 21/8173; G06T 17/00
USPC ........................................................ 725/116
See application file for complete search history.

(56) References Cited

U.S. PATENT DOCUMENTS

| | | | | |
|---|---|---|---|---|
| 10,506,287 | B2 * | 12/2019 | Hattery | ................ H04N 21/858 |
| 10,872,116 | B1 * | 12/2020 | Yim | .......................... G06F 16/61 |
| 11,356,742 | B2 * | 6/2022 | Azuolas | ................ H04L 65/611 |
| 11,991,423 | B2 * | 5/2024 | Zhu | .................... H04N 21/2187 |
| 2007/0143493 | A1 * | 6/2007 | Mullig | .................. H04L 65/752 |
| | | | | 709/232 |
| 2015/0029342 | A1 * | 1/2015 | Im | ...................... H04N 21/2187 |
| | | | | 348/157 |
| 2015/0350118 | A1 * | 12/2015 | Yang | ...................... G06F 3/0237 |
| 2017/0068551 | A1 * | 3/2017 | Vadodaria | ............ G06Q 10/107 |
| 2018/0115645 | A1 * | 4/2018 | Lyer | .............. G06Q 10/063112 |
| 2018/0375807 | A1 * | 12/2018 | Krans | ...................... H04L 51/02 |
| 2019/0200085 | A1 * | 6/2019 | Merced | .................. G16H 20/70 |
| 2020/0005772 | A1 * | 1/2020 | Dai | ...................... G10L 15/1822 |
| 2020/0326996 | A1 * | 10/2020 | Lee | .......................... H04L 51/04 |
| 2020/0413156 | A1 * | 12/2020 | Zeiler | ................ H04N 21/4312 |
| 2021/0035576 | A1 * | 2/2021 | Kang | ...................... G10L 15/22 |
| 2022/0262080 | A1 * | 8/2022 | Burton | ................. G06V 40/168 |
| 2022/0377414 | A1 * | 11/2022 | Zu | ...................... H04N 21/4667 |
| 2022/0394348 | A1 * | 12/2022 | Hatambeiki | ........... G06V 40/28 |
| 2023/0023085 | A1 * | 1/2023 | Zhu | .......................... G06T 13/40 |
| 2023/0315385 | A1 * | 10/2023 | Akmal | .................... G06F 3/013 |
| | | | | 715/727 |
| 2024/0015341 | A1 * | 1/2024 | Kumar | ............. H04N 21/25891 |
| 2024/0054118 | A1 * | 2/2024 | Emma | ...................... G10L 15/08 |
| 2024/0187655 | A1 * | 6/2024 | Kikuchi | ............... H04N 21/854 |

FOREIGN PATENT DOCUMENTS

| | | |
|---|---|---|
| CN | 109429075 A | 3/2019 |
| CN | 110035271 A | 7/2019 |
| CN | 110085211 A | 8/2019 |
| CN | 110941954 A | 3/2020 |
| CN | 111866529 A | 10/2020 |
| CN | 112333179 A | 2/2021 |
| CN | 112601100 A | 4/2021 |
| CN | 113194346 | 7/2021 |
| CN | 113421143 A | 9/2021 |
| CN | 113645472 A | 11/2021 |
| CN | 113766253 A | 12/2021 |
| CN | 113825031 A | 12/2021 |
| CN | 114125492 A | 3/2022 |
| JP | 6527627 B1 | 6/2019 |

OTHER PUBLICATIONS

China National Intellectual Property Adminstration; First Office Action issued in CN App No. 202210078888.5 dated Mar. 17, 2022; 16 pages.

China National Intellectual Property Adminstration; Second Office Action issued in CN App No. 202210078888.5 dated Apr. 12, 2022; 14 pages.

China National Intellectual Property Adminstration; Notification to Grant in CN App No. 202210078888.5 dated Apr. 20, 2022; 5 pages.

Xu Ting; "An Exploration of TV News Anchor's Expression in Virtual Environment"; Chinese Radio and Television Journal; Issue 7; Jul. 1, 2017.

* cited by examiner

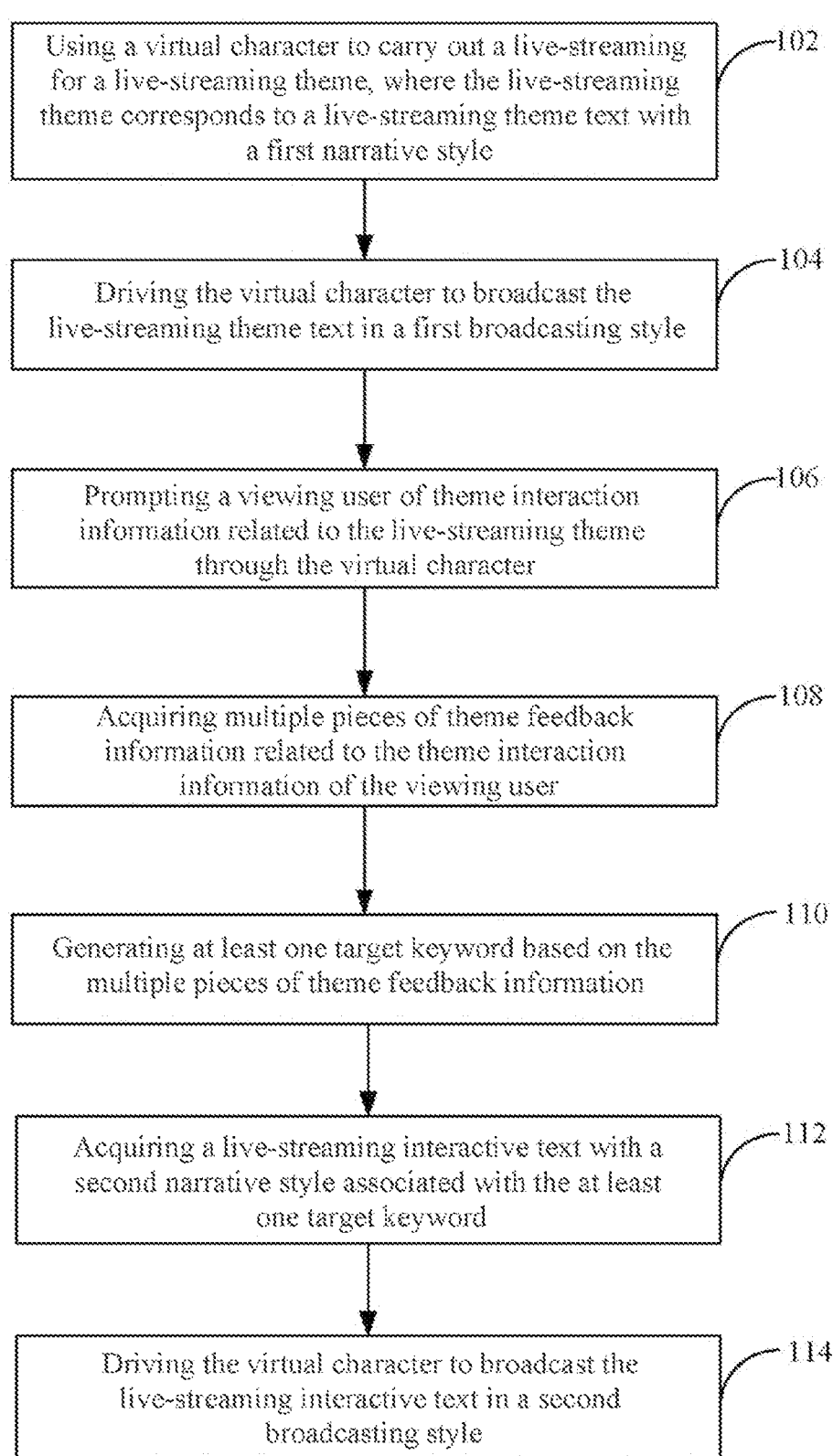

Using a virtual character to carry out a live-streaming for a live-streaming theme, where the live-streaming theme corresponds to a live-streaming theme text with a first narrative style ⎯102

Driving the virtual character to broadcast the live-streaming theme text in a first broadcasting style ⎯104

Prompting a viewing user of theme interaction information related to the live-streaming theme through the virtual character ⎯106

Acquiring multiple pieces of theme feedback information related to the theme interaction information of the viewing user ⎯108

Generating at least one target keyword based on the multiple pieces of theme feedback information ⎯110

Acquiring a live-streaming interactive text with a second narrative style associated with the at least one target keyword ⎯112

Driving the virtual character to broadcast the live-streaming interactive text in a second broadcasting style ⎯114

FIG. 1

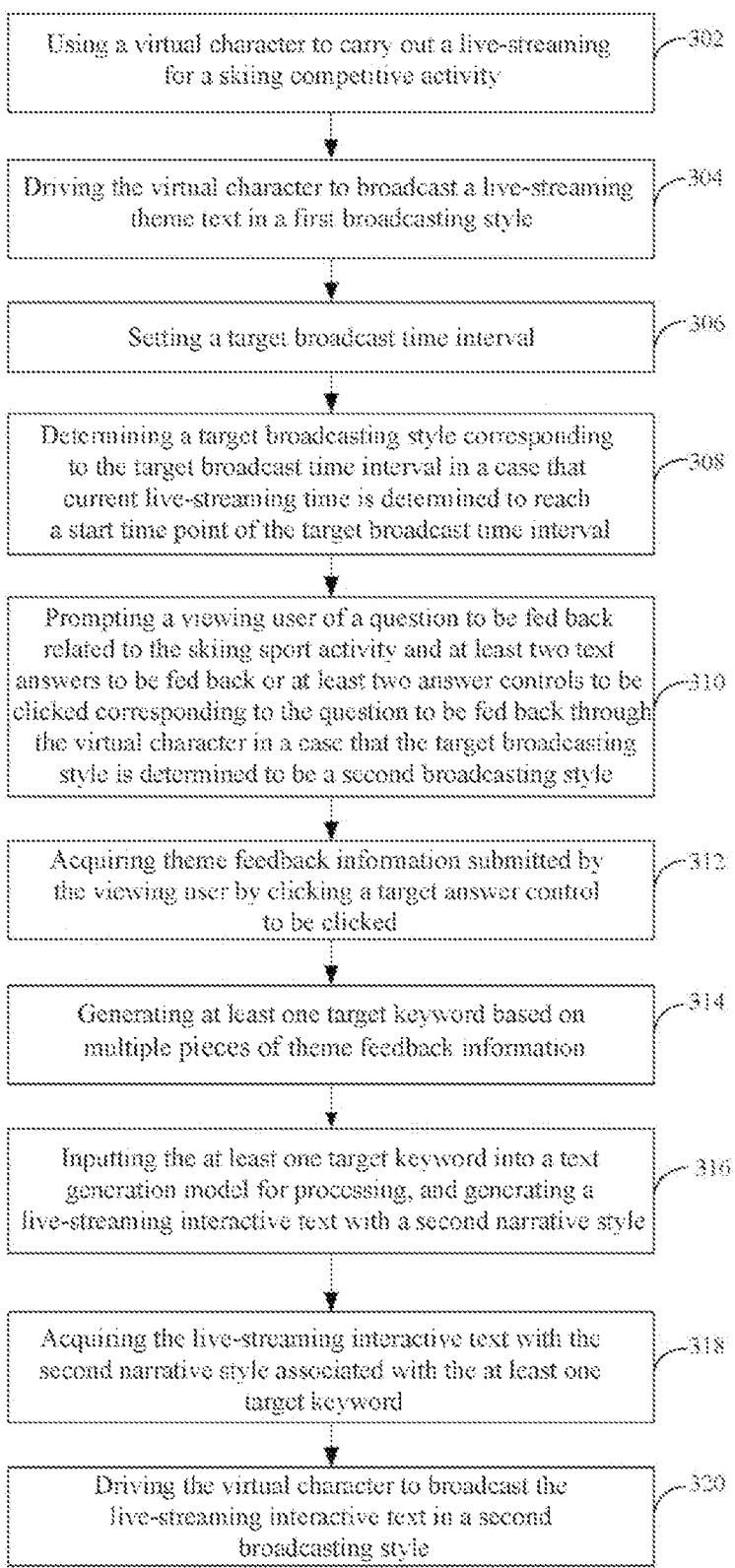

Using a virtual character to carry out a live-streaming
for a skiing competitive activity ⟋302

Driving the virtual character to broadcast a live-streaming
theme text in a first broadcasting style ⟋304

Setting a target broadcast time interval ⟋306

Determining a target broadcasting style corresponding
to the target broadcast time interval in a case that
current live-streaming time is determined to reach
a start time point of the target broadcast time interval ⟋308

Prompting a viewing user of a question to be fed back
related to the skiing sport activity and at least two text
answers to be fed back or at least two answer controls to be
clicked corresponding to the question to be fed back through
the virtual character in a case that the target broadcasting
style is determined to be a second broadcasting style ⟋310

Acquiring theme feedback information submitted by
the viewing user by clicking a target answer control
to be clicked ⟋312

Generating at least one target keyword based on
multiple pieces of theme feedback information ⟋314

Inputting the at least one target keyword into a text
generation model for processing, and generating a
live-streaming interactive text with a second narrative style ⟋316

Acquiring the live-streaming interactive text with the
second narrative style associated with the at least one
target keyword ⟋318

Driving the virtual character to broadcast the
live-streaming interactive text in a second
broadcasting style ⟋320

FIG. 3

METHOD AND APPARATUS FOR GENERATING LIVE-STREAMING CONTENT

CROSS-REFERENCE TO RELATED APPLICATIONS

This application is a National Stage of International Application No. PCT/CN2023/072112, filed on Jan. 13, 2023, which claims priority to Chinese Patent Application No. 202210078888.5, filed to China National Intellectual Property Administration on Jan. 24, 2022 and entitled "METHOD AND APPARATUS FOR GENERATING LIVE-STREAMING CONTENT". The contents of the two applications are hereby incorporated by reference in their entireties.

TECHNICAL FIELD

Embodiments of the present application relate to the field of computer technology, and in particular, to a method for generating live-streaming content.

BACKGROUND

With the rise of live-streaming platforms, more and more users use live-streaming to promote various information in a live-streaming room of the live-streaming platform, such as e-commerce on the live-streaming platform, teaching on the live-streaming platform, and performing on the live-streaming platform.

In order to enhance the interest and interactivity of live-streaming, virtual image live-streaming, as a very important part of live-streaming services, has occupied an increasing proportion of live-streaming services in recent years.

However, at present, the live-streaming method of live-streaming room in the live-streaming platform is fixed and single, which can not better meet the needs of users. Therefore, an effective method is urgently needed to solve such problems.

SUMMARY

In view of this, embodiments of the present application provide a method for generating live-streaming content. One or more embodiments of the present application simultaneously relate to an apparatus for generating live-streaming content, a computing device, a computer-readable storage medium, and a computer program to address technical deficiencies existing in the prior art.

According to a first aspect of an embodiment of the present application, a method for generating live-streaming content is provided, which is applied to a virtual live-streaming control system and includes:

using a virtual character to carry out a live-streaming for a live-streaming theme, where the live-streaming theme corresponds to a live-streaming theme text with a first narrative style;

driving the virtual character to broadcast the live-streaming theme text in a first broadcasting style;

prompting a viewing user of theme interaction information related to the live-streaming theme through the virtual character;

acquiring multiple pieces of theme feedback information related to the theme interaction information of the viewing user;

generating at least one target keyword based on the multiple pieces of theme feedback information;

acquiring a live-streaming interactive text with a second narrative style associated with the at least one target keyword; and driving the virtual character to broadcast the live-streaming interactive text in a second broadcasting style.

According to a second aspect of an embodiment of the present application, an apparatus for generating live-streaming content is provided, comprising:

a live-streaming module, configured to use a virtual character to carry out a live-streaming for a live-streaming theme, where the live-streaming content includes a live-streaming theme text with a first narrative style corresponding to the live-streaming theme and a live-streaming interactive text with a second narrative style associated with at least one target keyword;

a driving module, configured to drive the virtual character to broadcast the live-streaming theme text in a first broadcasting style and to broadcast the live-streaming interactive text in a second broadcasting style;

a prompt module, configured to prompt a viewing user of theme interaction information related to the live-streaming theme through the virtual character;

a first acquisition module, configured to acquire multiple pieces of theme feedback information related to the theme interaction information of the viewing user;

a generation module, configured to generate at least one target keyword based on the multiple pieces of theme feedback information; and a second acquisition module, configured to acquire the live-streaming interactive text with the second narrative style associated with the at least one target keyword.

According to a third aspect of an embodiment of the present application, a computing device is provided, comprising:

a memory and a processor;

where the memory is used to store computer executable instructions, and the processor is configured to execute the computer executable instructions to implement the steps of any of the method for generating live-streaming content.

According to a fourth aspect of an embodiment of the present application, a computer-readable storage medium is provided, which stores a computer-executable instruction, when the instruction is executed by a processor, the steps of any of the method for generating live-streaming content are implemented.

According to a fifth aspect of an embodiments of the present application, a computer program is provided, when the computer program is executed in a computer, the computer is caused to execute the steps of the method for generating live-streaming content.

The embodiment of the present application uses a virtual character to carry out a live-streaming for a live-streaming theme, where the live-streaming theme corresponds to a live-streaming theme text with a first narrative style; drives the virtual character to broadcast the live-streaming theme text in a first broadcasting style; prompts a viewing user of theme interaction information related to the live-streaming theme through the virtual character; acquires multiple pieces of theme feedback information related to the theme interaction information of the viewing user; generates at least one target keyword based on the multiple pieces of theme feedback information; acquires a live-streaming interactive text with a second narrative style associated with the at least one target keyword; and drives the virtual character to broadcast the live-streaming interactive text in a second broadcasting style.

In the implementation of the present application, a virtual character can be driven to broadcast a live-streaming theme text or a live-streaming interactive text with different narrative styles related to a live-streaming theme according to different broadcasting styles in different time intervals, which is conducive to enhancing the interest and interaction of live-streaming, and at the same time, it is conducive to realizing the diversity of live-streaming methods, so as to better meet users' needs for different types of information.

BRIEF DESCRIPTION OF DRAWINGS

FIG. 1 is a flow diagram of a method for generating live-streaming content provided by an embodiment of the present application.

FIG. 3 is a flow diagram of a processing process of a method for generating live-streaming content provided by an embodiment of the present application.

DESCRIPTION OF EMBODIMENTS

Figure 2A:
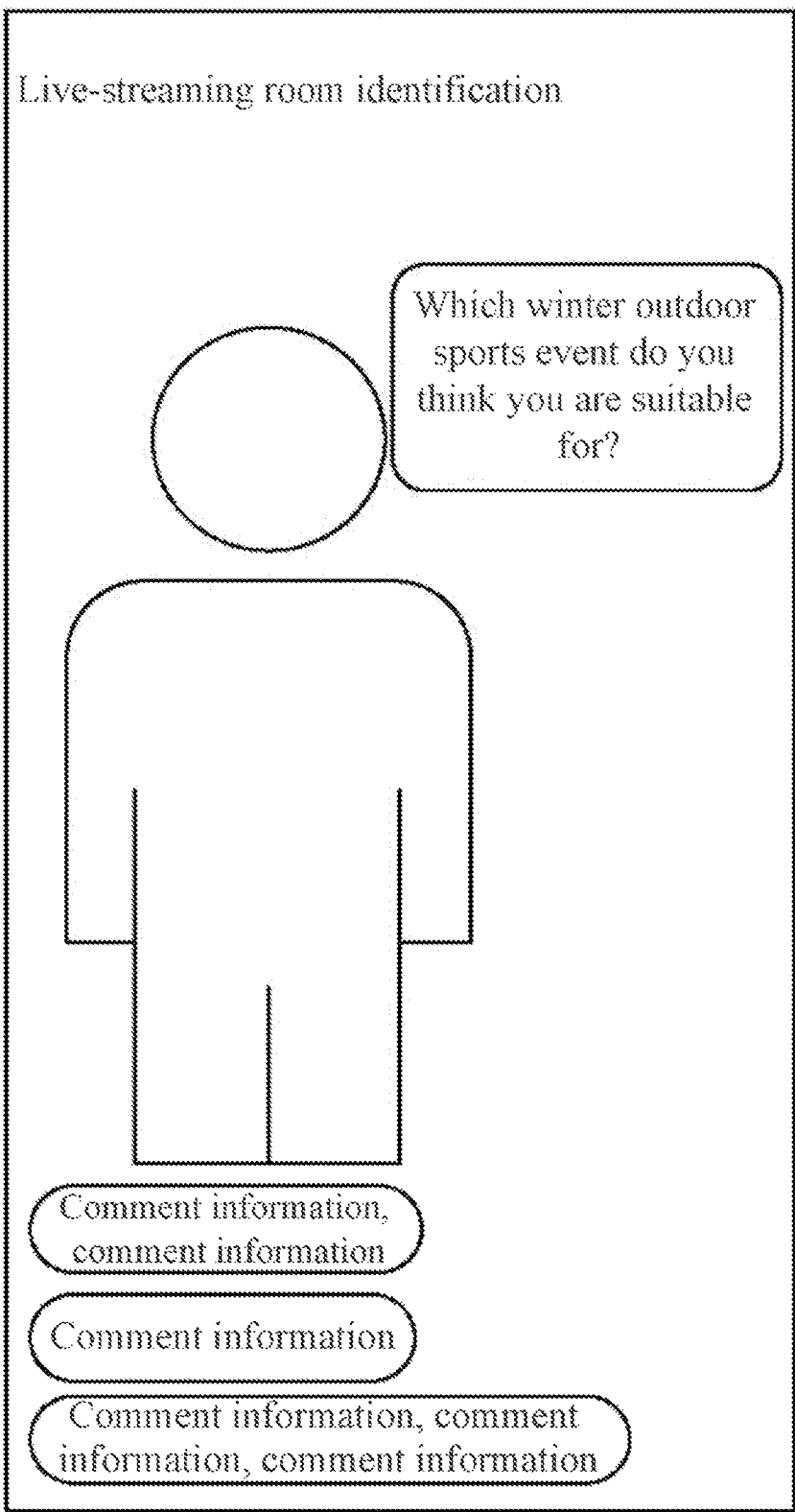
FIG. 2a is a schematic diagram of a display result of theme interaction information provided by an embodiment of the present application.

Many specific details are given in the following description to facilitate a full understanding of this specification. However, the present application may be implemented in many ways different from those described herein, and persons skilled in the art may do similar promotion without violating the intension of the present application, and therefore the present application is not subject to the specific implementation disclosed below.

Terms used in one or more embodiments of the present application are used solely for the purpose of describing specific embodiments and are not intended to limit one or more embodiments of the present application. The terms "a", "said" and "the" in the singular form as used in one or more embodiments of the present application and the accompanying claims are also intended to include the majority form, unless the context clearly indicates otherwise. It should also be understood that the term "and/or" as used in one or more embodiments of the present application refers to and encompasses any or all possible combinations of one or more related listed items.

It should be understood that although the terms first and second classes may be used to describe various information in one or more embodiments of the present application, such information should not be limited to these terms. These terms are used only to distinguish the same type of information from one another. For example, without departing from the scope of one or more embodiments of the present application, the first may also be referred to as the second, and likewise the second may be referred to as the first.

Depending on the context, the word "if" as used here can be interpreted as "at time of . . . " or "when . . . " or "in response to determination of".

First, noun terms involved in one or more embodiments of the present application is explained.

Digital human: a virtual human with a digital form that has abilities to express itself with words, facial expressions, and body movements.

Live-streaming room: each live stream's presentation window corresponds to one live-streaming room. The live-streaming room is unique in a service platform.

Virtual live-streaming room: a digital human anchor and a digital live-streaming room constructed by digital drive technology provide live-streaming content in an interactive way of live-streaming by artificial man, which can also be understood as a live-streaming room with a specific type (a type of live-streaming by a virtual character as an anchor in a live-streaming room) in a live-streaming room. For example, it may include but not limited to game live-streaming room, film live-streaming room, life live-streaming room, comprehensive live-streaming room, etc. The virtual live-streaming room here can be any live-streaming room, and the virtual live-streaming room can include digital human anchors, scenes, live-streaming text and other components.

In the present application, a method for generating live-streaming content is provided. The present application also relates to an apparatus for generating live-streaming content, a computing device, a computer readable storage medium, and a computer program, which are described in detail in the following embodiments.

FIG. 1 shows a flow diagram of a method for generating live-streaming content provided according to an embodiment of the present application, including the following steps.

Step 102, using a virtual character to carry out a live-streaming for a live-streaming theme, where the live-streaming theme corresponds to a live-streaming theme text with a first narrative style.

Specifically, the live-streaming room is usually used for live-streaming of a commodity or a game, but in the case of a special live-streaming theme, the virtual character in the live-streaming room can be set up to carry out the live-streaming around the live-streaming theme. The live-streaming theme can be a medium, medium-large or large scale event, competition or conference.

In one embodiment, in the process of using the virtual character to carry out the live-streaming for the live-streaming theme, the virtual character can perform information broadcasting of different types of information related to the live-streaming theme, for example, a first type information has knowledge attributes and a second type information has transactional attributes. For example, the first type information can be non-physical objects such as news information and encyclopedia information related to live-streaming theme. The second type information can be physical objects with transactional attributes, such as a commodity or a tradable resource related to the live-streaming theme.

In addition, the virtual character can carry out the live-streaming, which needs to rely on drive of the live-streaming content. Merchants need the virtual character to carry out the live-streaming throughout the day when no one is operating online. During the live-streaming, the virtual character can answer questions from viewing users, interact with viewing users, and introduce first type information and/or second type information related to the live-streaming theme to complete the live-streaming. In practical application, the virtual character usually expresses the text content of the live-streaming theme text corresponding to the live-streaming theme, and finally become the live-streaming stream. A playback engine provides a variety of playback capabilities such as sequence, timing, loop, and interjection, the live-streaming content can be expressed in a timely manner, whether it is based on a prewritten live-streaming theme text, or based on a temporary decision that result from a live-streaming room event and behavior.

Therefore, when the virtual character is used to carry out the live-streaming for the live-streaming theme, the virtual character can be driven to carry out the live-streaming by broadcasting the live-streaming theme text of the first type information and/or the second type information.

Since the first type information can be non-physical objects such as news information and encyclopedia information related to live-streaming theme, and the second type information can be physical objects such as the commodity or the tradable resource related to the live-streaming theme, whether it is news information, encyclopedia information, commodities or tradable resources, it has characteristics of objectivity and authenticity. Therefore, the live-streaming theme text with the first narrative style can be a text that contains objective introduction, narration, description, explanation or objective evaluation of news, encyclopedias, events, commodities, etc.

Step 104, driving the virtual character to broadcast the live-streaming theme text in a first broadcasting style.

Specifically, the first broadcasting style is an expression of objective facts, rather than an expression of emotions.

In the case that the live-streaming theme text of the first narrative style is the text containing the objective introduction, narration, description, explanation or objective evaluation of the news, encyclopedias, events, commodities, etc., if the virtual character is driven to broadcast the live-streaming theme text with the first narrative style, the virtual character can be driven to broadcast the live-streaming theme text with the first narrative style objectively according to the first broadcasting style, so as to reflect the objectivity and authenticity of the text content in the live-streaming theme text with the first narrative style.

In step 106, prompting a viewing user of theme interaction information related to the live-streaming theme through the virtual character.

Specifically, in the process of driving the virtual character to broadcast the live-streaming theme text with the first broadcasting style in the first narrative style, the viewing user can be prompted of the theme interaction information related to the live-streaming theme through the virtual character.

The theme interaction information includes but is not limited to a question or an opinion, etc. Through the way of prompting the viewing user of the theme interaction information by the virtual character, the viewing user is guided to give feedback on the theme interaction information, so as to realize interaction with the viewing user, which is conducive to improving an interactive experience of the viewing user and thus conducive to improving an viewing experience of the live-streaming.

In one embodiment, a target broadcast time interval can be set, and a target broadcasting style corresponding to the target broadcast time interval can be determined in a case that a current live-streaming time is determined to reach a start time point of the target broadcast time interval; in a case that the target broadcasting style is determined to be a second broadcasting style, the viewing user is prompted of the theme interaction information related to the live-streaming theme through the virtual character.

Specifically, the second broadcasting style can be an expression of subjective content and a broadcasting style of emotional expression.

An embodiment of the present application may set a target broadcast time interval to drive the virtual character to broadcast a live-streaming theme text with other narrative styles except the first narrative style in the target broadcast time interval, or drive the virtual character to broadcast a live-streaming interactive text with a second narrative style in the second broadcasting style in the target broadcast time interval.

In a case that it is determined that a start time point of the target broadcast time interval is reached, and the target broadcasting style corresponding to the target broadcast time interval is determined to be the second narrative style, the virtual character can prompt the viewing user of a question or a opinion related to the live-streaming theme, so as to guide the viewing user to feedback its answer or opinion on the question or the opinion, and the virtual character broadcasts the live-streaming interactive text with the second narrative style according to the second broadcasting style according to the feedback of the viewing user.

The live-streaming interactive text with the second narrative style can be a text containing jokes, humorous cross-talks, talk shows and other subjective, colloquial or even unreal content.

Taking the application of the method for generating live-streaming content provided by the embodiment of the present application in a virtual live-streaming scene of e-commerce as an example, if the live-streaming theme is a skiing competitive activity, the live-streaming theme text with the first narrative style can be news, events, encyclopedias and other information of the skiing activity; the live-streaming interactive text with the second narrative style can be small jokes or cross-talks related to competitive events in the skiing competitive activity.

For example, virtual characters can be set up to alternate broadcast the live-streaming theme for 24 hours in the live-streaming room, and the virtual characters can be set to broadcast the live-streaming interactive text with the first narrative style in the first broadcasting style from 00:00 to 20:00 and from 21:00 to 00:00, and broadcast live-streaming interactive text with the second narrative style in the second broadcasting style from 20:00 to 21:00. When it is detected to reaches 20:00, that is, when a current live-streaming time reaches the start time point of the target broadcast time interval corresponding to the second broadcasting style, the virtual characters can prompt the viewing users of a question or an opinion related to the skiing competitive activity, so as to guide the viewing users to comment on the problem or the opinion, and the virtual character broadcasts small jokes or cross-talks related to competitive events in the skiing competitive activity according to the comment of the viewing users.

In this way, live-streaming content with different types or different narrative styles can be provided to viewing users in different time intervals, which is conducive to enhancing the interest and interaction of live-streaming, and at the same time, it is conducive to realizing the diversity of live-streaming methods, so as to better meet the needs of viewing users for different types of information.

Further, the prompting the viewing user of the theme interaction information related to the live-streaming theme through the virtual character is specifically prompting the viewing user of a question to be fed back related to the live-streaming theme through the virtual character; or, prompting the viewing user of a question to be fed back related to the live-streaming theme and at least two text answers to be fed back or at least two answer controls to be clicked corresponding to the question to be fed back through the virtual character.

Specifically, as mentioned above, in a case that it is determined that the current live-streaming time reaches the start time point of the target broadcast time interval, and the target broadcasting style corresponding to the target broadcast time interval is the second narrative style, the viewing user can be prompted of the theme interaction information related to the live-streaming theme through the virtual character. In the embodiment of the present application, the theme interaction information can be a question to be fed back to guide the viewing user to submit its own answer to the question to be fed back, and the virtual character will broadcast related small jokes or cross-talks according to the answer of the viewing user.

Following the above example, in a case that it is determined that the current live-streaming time reaches 20:00, the virtual character can prompt the viewing user of the theme interaction information related to the skiing competitive activity. If the theme interaction information is a question to be fed back, the question to be fed back can be "which winter outdoor sports event do you think you are suitable for?" to guide the viewing users to comment and reply in a comment area, a schematic diagram of a display result of a specific theme interaction information is shown in FIG. 2a.

In practical application, the problem to be fed back can also be displayed in the live-streaming room according to a target display effect, where the target display effect includes at least one of the following: display form, font, color, size, lace and dynamic special effect. Alternatively, when the virtual character throws a question, it can display the question to be fed back in the form of a small bubble.

In addition, in the embodiment of the present application, the theme interaction information can be a problem to be fed back, and at least two text answers to be fed back or at least two answer controls to be clicked corresponding to the problem to be fed back can be displayed while displaying the problem to be fed back. The information contained in the text answers to be fed back or the answer controls to be clicked can be a shortcut phrase corresponding to the question to be fed back, and the text answer to be fed back can be displayed in the form of bubble, the viewing user can directly click the shortcut phrase in the bubble or control to comment, or enter a comment in an input box, and submit the comment and display it to the comment area simultaneously. The virtual character broadcast related small jokes or cross-talks according to the comment of the viewing user.

Figure 2B:
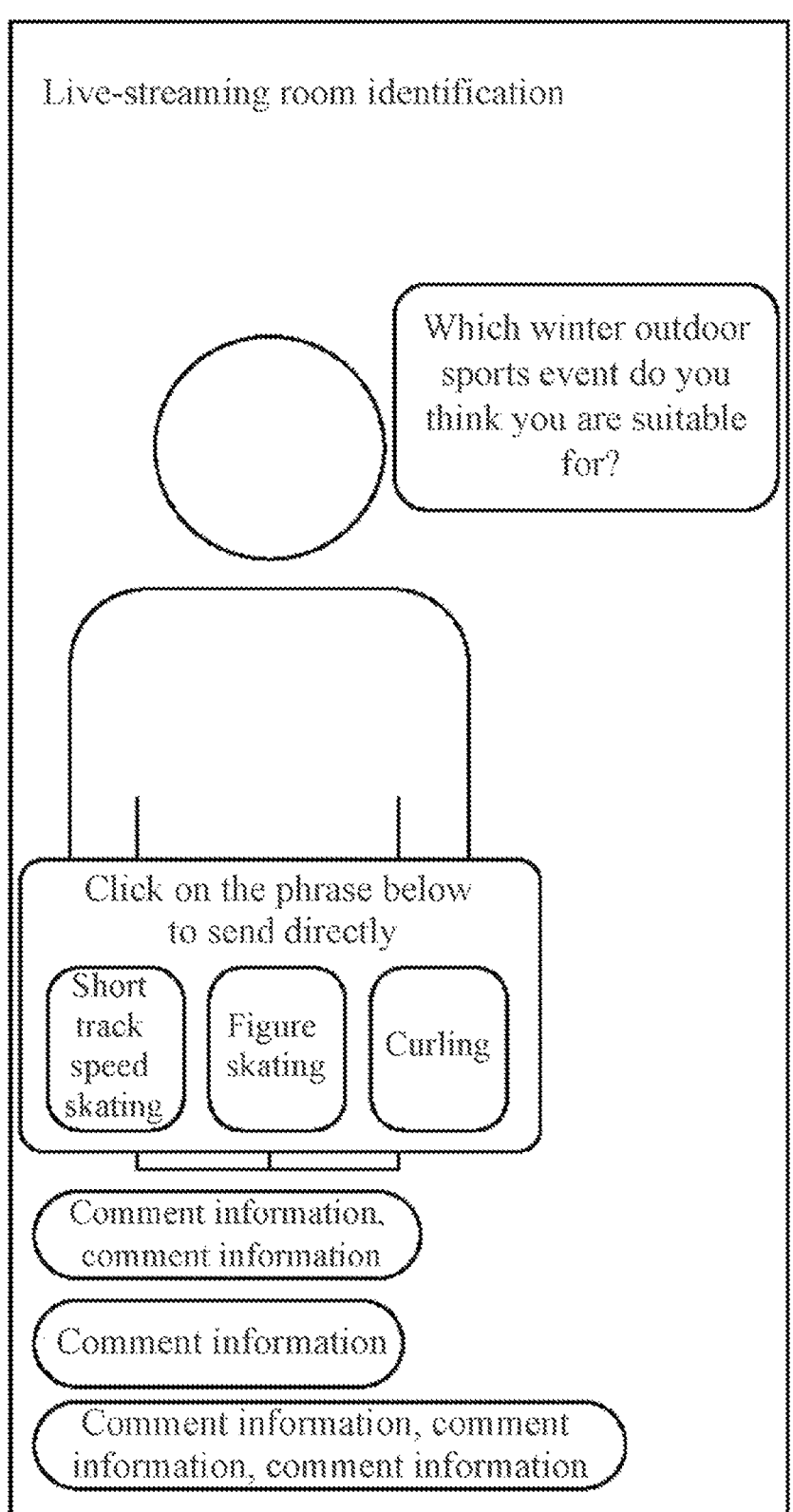
FIG. 2b is a schematic diagram of a display result of another theme interaction information provided by an embodiment of the present application.

Following the above example, when it is determined that the current live-streaming time reaches 20:00, the virtual character can prompt the viewing users of the theme interaction information related to skiing competitive activities. If the theme interaction information is a question to be fed back, and the question to be fed back is "which winter outdoor sports event do you think you are suitable for?", then the answer control to be click of the question to be fed back can be displayed at the same time, and information contained in each answer control to be click can be respectively "short track speed skating", "figure skating", "curling" and so on. A schematic diagram of a display result of another specific theme interaction information is shown in FIG. 2b. The viewing user can directly click on the control to comment, and the virtual character broadcasts related small jokes or cross-talks according to the comment of the viewing users.

Further, after the virtual character prompts the viewing user of the theme interaction information related to the live-streaming theme, it can wait for the multiple pieces of theme feedback information of the viewing user within a preset time, and at the same time broadcast a preset transition content related to the theme interaction information through the virtual character, which is called a holding content. The holding content refers to some encyclopedias about the problem to be fed back or pre-set transition speech for warming up the scene broadcast by the virtual character during the time when the virtual character throws the question to be fed back to the viewing user and collects the feedback information from the viewing user (tentatively between 30 s and 40 s). The number or length of the holding content can be set in advance, and one can be randomly selected to broadcast, and the holding content can be added or modified later (such as limiting the number of words in the content).

In the implementation of the present application, a virtual character can be driven to broadcast a live-streaming theme text or a live-streaming interactive text with different narrative styles related to a live-streaming theme according to different broadcasting styles in different time intervals, which is conducive to enhancing the interest and interaction of live-streaming, and at the same time, it is conducive to realizing the diversity of live-streaming methods, so as to better meet users' needs for different types of information.

Step 108, acquiring multiple pieces of theme feedback information related to the theme interaction information of the viewing user.

Specifically, the theme feedback information can be feedback information submitted by the viewing user based on the theme interaction information, and specifically be comment information sent by the viewing user based on the theme interaction information, including but not limited to text, expression, image, etc.

In an embodiment, if the theme interaction information is the question to be fed back and at least two text answers to be fed back or at least two answer controls to be clicked corresponding to the question to be fed back, the multiple pieces of theme feedback information related to the theme interaction information of the viewing user is acquired, specifically, theme feedback information submitted by the viewing user by clicking a target answer control to be clicked is acquired, where the target answer control to be clicked is one of the at least two answer controls to be clicked.

Specifically, in order to strengthen the interaction between the virtual character and the viewing user, so as to increase the interest of the live-streaming room, and thus enhance the viewing user's interest in watching the live-streaming, the embodiment of the present application can set the virtual character to broadcast the live-streaming interactive text with the second narrative style in the second broadcasting style in a target time interval, and the specific live-streaming interactive text content to be broadcast is determined according to the theme feedback information submitted by the viewing user. Therefore, in a case that it is determined that the current live-streaming time reaches the target time interval, the virtual character can prompt the viewing user of the theme interaction information to guide the viewing user to submit the theme feedback information based on the theme interaction information.

Further, when the viewing user is prompted with the theme interactive information, the answer control to be clicked corresponding to the theme interactive information can be displayed for the viewing user. The viewing user can directly comment by clicking the answer control to be clicked, and the virtual character can broadcast related small jokes or cross-talks according to the comment of the viewing user.

In addition, if the theme interaction information is the question to be fed back, without displaying the answer control to be clicked for the viewing user, the viewing user can be guided to enter text comment information in the input box. After the viewing user submits the text comment information, the text comment information can be displayed to the comment area simultaneously. The virtual character broadcasts related small jokes or cross-talks according to the text comment information of the viewing user.

The embodiment of the present application uses the virtual character to prompt the viewing user of the information to be fed back related to the live-streaming theme, guides the user to comment on the question to be fed back, or submits corresponding feedback information by clicking the answer control to be clicked, and broadcasts corresponding live-streaming interactive text with the second narrative style based on the feedback information. That is, the embodiment of the present application broadcasts the corresponding live-streaming interactive text for the viewing user by interacting with the viewing user, which is conducive to improve interactive experience of the viewing user, so as to improve the live-streaming viewing experience of the viewing user.

Step 110, generating at least one target keyword based on the multiple pieces of theme feedback information.

Specifically, if the user inputs the theme feedback information manually in the input box, the theme feedback information can contain text or pictures and other information. In this case, semantic recognition can be performed on the theme feedback information to determine at least one target keyword according to a recognition result.

In a case that the theme feedback information is text comment information, at least one target keyword related to the live-streaming theme can be acquired by performing keyword extracting on the multiple text comment information.

In addition, since information contained in the answer control to be clicked or the text answer to be fed back can be a shortcut phrase corresponding to the question to be fed back, if the user submits the theme feedback information by clicking the text answer to be fed back answer or the answer control to be clicked, then the theme feedback information is a quick phrase contained in the answer control to be clicked or the text answer to be fed back which is clicked by the user. In this case, the shortcut phrase can be used directly as the target keyword.

In step 112, acquiring a live-streaming interactive text with a second narrative style associated with the at least one target keyword.

Specifically, as mentioned above, the live-streaming interactive text with the second narrative style can be a text that contains subjective, colloquial or even unreal content such as jokes, humorous cross-talks and talk shows.

In an embodiment of the present application, the live-streaming interactive text can be pre-edited or automatically generated in real time according to the target keyword.

In the specific implementation, a text generation model can be used to generate the live-streaming interactive text. Specifically, a keyword related to the live-streaming theme can be determined first. The keyword is input into the text generation model for processing, and the live-streaming interactive text with the second narrative style is generated.

The text generation model is trained in the following ways: acquiring an initial theme text related to the live-streaming theme; and taking the initial theme text as a training sample, inputting the initial theme text into a text generation model to be trained for training, and obtaining the text generation model.

In addition, the text generation model can be optimized. Specifically, an intermediate theme text is generated by inputting the keyword into the text generation model for processing; a reference theme text generated by the user adjusting the intermediate theme text is acquired; and the reference theme text is input into the text generation model for processing to iteratively optimize the text generation model.

Specifically, after determining the live-streaming theme, the keyword related to the live-streaming theme can be determined first, and then the user can write part of the initial theme text related to the keyword. The initial theme text can be a text with the second narrative style, such as cross-talks and jokes. Then, the keyword and the initial theme text can be used as training samples to train the text generation model to be trained, and to obtain the text generation model.

In a case that it need to pre-edit the live-streaming interactive text by using the text generation model, the keyword related to the live-streaming theme can be input into the text generation model, so that the text generation model can generate the live-streaming interactive text (cross-talks or jokes, etc.) corresponding to the keyword with the second narrative style.

In order to ensure the accuracy of the live-streaming interactive text generated by the text generation model, an embodiment of the present application can first input the keyword related to the live-streaming theme into the text generation model for processing, generate the corresponding live-streaming interactive text, and then the user will modify and adjust the part of the live-streaming interactive text, and then input the adjusted live-streaming interactive text into the text generation model for processing to adjust a model parameter of the text generation model, so that iterative optimization of the text generation model is realized.

In practical application, taking the live-streaming theme as the skiing competition activity as an example, the live-streaming interactive text intelligently generated by an algorithm or the text generation model can be stored in a text storage module of a virtual live-streaming control system. In addition, the live-streaming interactive text can be inserted into a script broadcast by the virtual character according to the dimension of a problem, thus the live-streaming interactive text with the second narrative style can be broadcast in the second broadcasting style in the target time interval (editing intelligent talk show program).

The text storage module stores contents including question names, questions, transition contents, live-streaming interactive texts generated by algorithm and matched keywords. At the same time, it supports manual modification of problem names and problems, and supports manual modification, addition, and deletion of transitional content.

In script setup-script editing, a live-streaming party can add opening, laying, ending and other statements in a script by itself, and the text storage module can add live-streaming interactive text in the dimension of [question], such as adding 10 cross-talks per day.

In the specific implementation, because the virtual character can carry out live-streaming, it needs to rely on the drive of live-streaming content. Therefore, when the virtual character are used to carry out live-streaming on the live-streaming theme, a script can be generated based on the live-streaming theme text with the first narrative style corresponding to the live-streaming theme, and then the live-streaming can be carried out by way of driving the virtual character to broadcast the content contained in the script.

In a case that it needs to use the virtual character to broadcast the live-streaming interactive text with the second narrative style in the second broadcasting style in the target time interval, the live-streaming interactive text with the second narrative style can be added to a target playback position in a live-streaming waiting queue corresponding to the live-streaming theme according to a preset broadcast rule. The preset broadcast rule includes but not limited to a starting time and a broadcast duration of a broadcast with the second narrative style. Adding the live-streaming interactive text with the second narrative style to the target broadcast position of the live-streaming waiting queue is equivalent to adding the live-streaming interactive text with the second narrative style to the script broadcast by the virtual character according to the preset broadcast rule, so as to ensure that the live-streaming interactive text in the script is broadcast by the virtual character in a case that the start time point of the target time interval is reached, so as to realize diversified live-streaming of relevant content of the live-streaming theme.

In addition, in a case that it needs to automatically generating the live-streaming interactive text based on the target keyword in real time, it can determine a text generation rule of the live-streaming interactive text with the second narrative style; and generate the live-streaming interactive text with the second narrative style associated with the at least one target keyword based on the text generation rule and the at least one target keyword.

Specifically, the text generation rule include, but is not limited to, manually generated by a user or automatically generated with the help of the text generation model.

After the target keyword is determined, if the live-streaming interactive text with the second narrative style corresponding to the target keyword needs to be generated in real time, the target keyword can be input into the text generation model, and the text generation model can process the target keyword and generate the live-streaming interactive text with the second narrative style associated with the target keyword, or the live-streaming interactive text with the second narrative style can be produced by the live-streaming party according to the target keyword.

Step 114, driving the virtual character to broadcast the live-streaming interactive text in a second broadcasting style.

Specifically, after acquiring the live-streaming interactive text with the second narrative style, the virtual character can be driven to broadcast the live-streaming interactive text with the second broadcasting style.

Following the previous example, the virtual character prompts the viewing user of the question to be fed back "which winter outdoor sports event do you think you are suitable for?" and then broadcasts the preset transition content. After the broadcast, the virtual live-streaming control system will collect the feedback information submitted by the viewing user, and select a matching viewing user whose user nickname is xxx from this part of the feedback information. If the target keyword corresponding to the feedback information of the viewing user is determined to be "curling", the virtual character can broadcast a cross-talk matching the target keyword. For example: when I see @xxx saying that it is suitable for curling, I often wonder whether I can become a curling trophy winner in the sports meeting one day as long as I mop a floor more at home.

At the same time of broadcasting the cross-talk, the feedback information of the viewing user can be displayed through a small bubble, so that the viewing user feels lucky to be selected, so as to improve the user interaction experience.

Because the second broadcasting style can be a broadcasting style of expression of subjective content, as well as emotional expression, and the live-streaming interactive text with the second narrative style contains jokes, or cross-talks, etc., the live-streaming interactive text is, therefore, broadcast in the second broadcasting style, that is, the talk show is told by the virtual character, which makes the atmosphere of the live-streaming room more relaxed and humorous, and is conducive to improving the live-streaming viewing experience of the user.

It should be noted that a method for generating live-streaming content provided in the embodiment of the present application can be applied to any of the live-streaming scenes or a combination live-streaming of at least two live-streaming scenes of the following: e-commerce virtual live-streaming scenes, game virtual live-streaming scenes, education virtual live-streaming scenes, animation virtual live-streaming scenes, social virtual live-streaming scenes, event virtual live-streaming scenes, news information virtual live-streaming scenes. In order to facilitate understanding, the method for generating live-streaming content provided by the embodiment of the present application takes a virtual e-commerce live-streaming scene as an example to describe the specific method for generating live-streaming content in detail.

The embodiment of the present application uses a virtual character to carry out a live-streaming for a live-streaming theme, where the live-streaming theme corresponds to a live-streaming theme text with a first narrative style; drives the virtual character to broadcast the live-streaming theme text in a first broadcasting style; prompts a viewing user of theme interaction information related to the live-streaming theme through the virtual character; acquires multiple pieces of theme feedback information related to the theme interaction information of the viewing user; generates at least one target keyword based on the multiple pieces of theme feedback information; acquires a live-streaming interactive text with a second narrative style associated with the at least one target keyword; and drives the virtual character to broadcast the live-streaming interactive text in a second broadcasting style.

In the implementation of the present application, a virtual character can be driven to broadcast a live-streaming theme text or a live-streaming interactive text with different narrative styles related to a live-streaming theme according to different broadcasting styles in different time intervals, which is conducive to enhancing the interest and interaction of live-streaming, and at the same time, it is conducive to realizing the diversity of live-streaming methods, so as to better meet users' needs for different types of information.

In combination with the attached FIG. 3, the application of the method for generating live-streaming content provided by the present application in the skiing competitive activity scene is taken as an example to further explain the method for generating live-streaming content. FIG. 3 shows a flow diagram of a processing process of a method for generating live-streaming content provided by an embodiment of the present application, including the following steps.

Step 302, using a virtual character to carry out a live-streaming for a skiing competitive activity, where the skiing competitive activity corresponds to a live-streaming theme text with a first narrative style.

Step 304, driving the virtual character to broadcast a live-streaming theme text in a first broadcasting style.

Step 306, setting a target broadcast time interval.

Step 308, determining a target broadcasting style corresponding to the target broadcast time interval in a case that current live-streaming time is determined to reach a start time point of the target broadcast time interval.

Step 310, prompting a viewing user of a question to be fed back related to the skiing sport activity and at least two text answers to be fed back or at least two answer controls to be clicked corresponding to the question to be fed back through the virtual character in a case that the target broadcasting style is determined to be a second broadcasting style.

Step 312, acquiring theme feedback information submitted by the viewing user by clicking a target answer control to be clicked, where the target answer control to be clicked is one of the at least two answer controls to be clicked.

Step 314, generating at least one target keyword based on multiple pieces of theme feedback information.

Step 316, inputting the at least one target keyword into a text generation model for processing, and generating a live-streaming interactive text with a second narrative style.

Step 318, acquiring the live-streaming interactive text with the second narrative style associated with the at least one target keyword.

Step 320, driving the virtual character to broadcast the live-streaming interactive text in a second broadcasting style.

In the implementation of the present application, a virtual character can be driven to broadcast a live-streaming theme text or a live-streaming interactive text with different narrative styles related to the skiing competitive activity according to different broadcasting styles in different time intervals, which is conducive to enhancing the interest and interaction of live-streaming, and at the same time, it is conducive to realizing the diversity of live-streaming methods, so as to better meet users' needs for different types of information.

Figure 4:
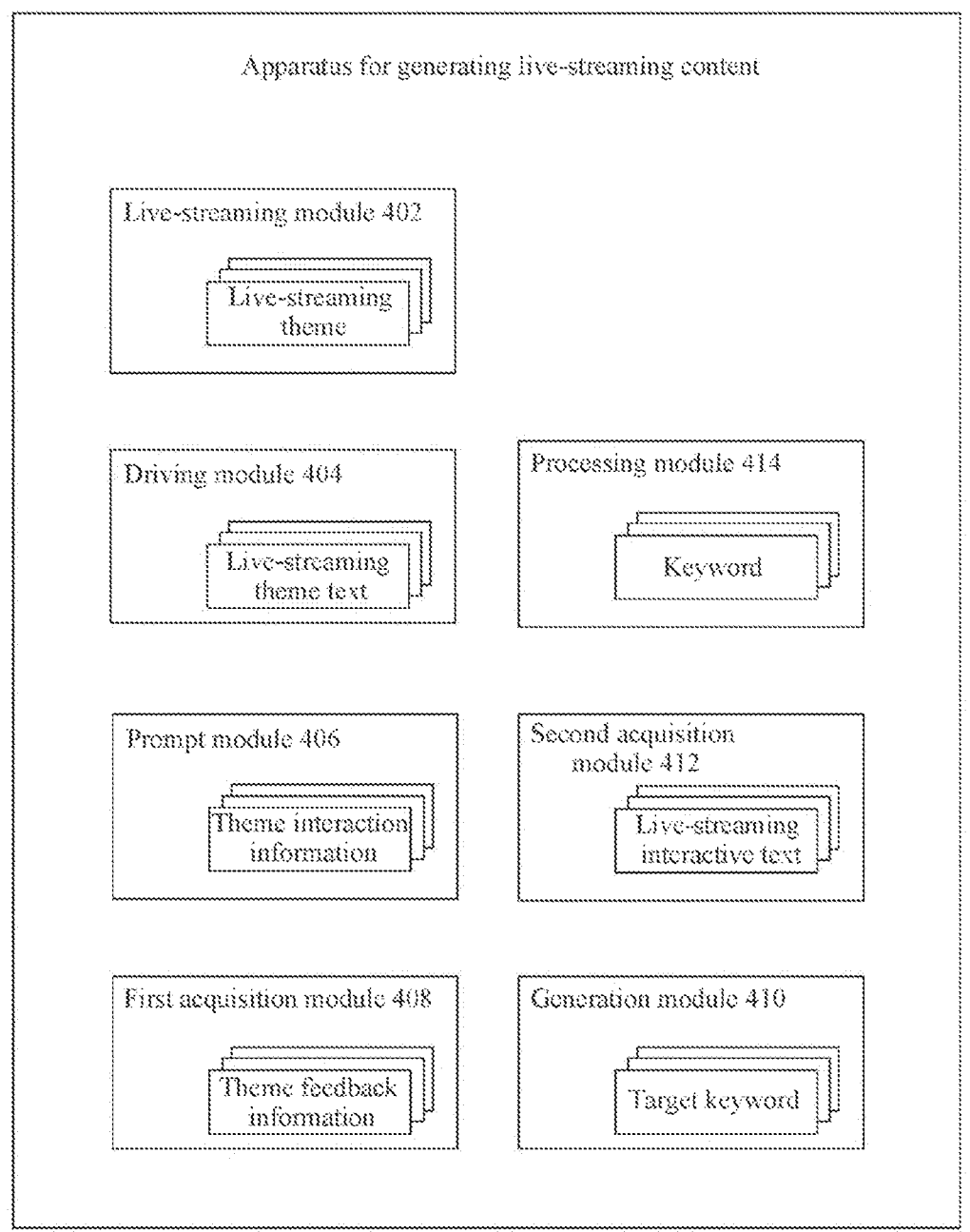
FIG. 4 is a structural diagram of an apparatus for generating live-streaming content provided by an embodiment of the present application.

Corresponding to the above embodiments of the method, the present application further provides an embodiment of an apparatus for generating live-streaming content. FIG. 4 shows a structural diagram of an apparatus for generating live-streaming content provided by an embodiment of the present application. As shown in FIG. 4, the apparatus includes:

a live-streaming module 402, configured to use a virtual character to carry out a live-streaming for a live-streaming theme, where the live-streaming content includes a live-streaming theme text with a first narrative style corresponding to the live-streaming theme and a live-streaming interactive text with a second narrative style associated with at least one target keyword.

a driving module 404, configured to drive the virtual character to broadcast the live-streaming theme text in a first broadcasting style and to broadcast the live-streaming interactive text in a second broadcasting style;

a prompt module 406, configured to prompt a viewing user of theme interaction information related to the live-streaming theme through the virtual character;

a first acquisition module 408, configured to acquire multiple pieces of theme feedback information related to the theme interaction information of the viewing user;

a generation module 410, configured to generate at least one target keyword based on the multiple pieces of theme feedback information; and a second acquisition module 412, configured to acquire the live-streaming interactive text with the second narrative style associated with the at least one target keyword.

In an implementation, the apparatus for generating the live-streaming content further includes a processing module 414, configured to:

determine a keyword related to the live-streaming theme; and input the keyword into a text generation model for processing, and generate the live-streaming interactive text with the second narrative style.

In an implementation, the text generation model is trained in the following ways:

acquiring an initial theme text related to the live-streaming theme; and taking the initial theme text as a training sample, inputting the initial theme text into a text generation model to be trained for training, and obtaining the text generation model.

In an implementation, the processing module 414 is further configured to:

generate an intermediate theme text by inputting the keyword into the text generation model for processing;

acquire a reference theme text generated by the user adjusting the intermediate theme text; and input the reference theme text into the text generation model for processing to iteratively optimize the text generation model.

In an implementation, the processing module 414 is further configured to: add the live-streaming interactive text to a target playback position in a live-streaming waiting queue corresponding to the live-streaming theme according to a preset broadcast rule.

In an implementation, the processing module 414 is further configured to:

set a target broadcast time interval;

determine a target broadcasting style corresponding to the target broadcast time interval in a case that a current live-streaming time is determined to reach a start time point of the target broadcast time interval; and perform the step of prompting the viewing user of the theme interaction information related to the live-streaming theme through the virtual character in a case that the target broadcasting style is determined to be the second broadcasting style.

In an implementation, the prompt module 406 is further configured to:

prompt the viewing user of a question to be fed back related to the live-streaming theme through the virtual character; or, prompt the viewing user of a question to be fed back related to the live-streaming theme and at least two text answers to be fed back or at least two answer controls to be clicked corresponding to the question to be fed back through the virtual character.

In an implementation, the first acquisition module 408 is further configured to:

wait for the multiple pieces of theme feedback information of the viewing user within a preset time, and at the same time broadcast a preset transition content related to the theme interaction information through the virtual character.

In an implementation, the first acquisition module 408 is further configured to:

acquire theme feedback information submitted by the viewing user by clicking a target answer control to be clicked, where the target answer control to be clicked is one of the at least two answer controls to be clicked; and acquire multiple text comment information of the viewing user related to the theme interaction information;

accordingly, the generation module 410 is further configured to:

acquire at least one target keyword related to the live-streaming theme by performing keyword extracting on the multiple text comment information.

In an implementation, the second acquisition module 412 is further configured to:

determine a text generation rule of the live-streaming interactive text with the second narrative style; and generate the live-streaming interactive text with the second narrative style associated with the at least one target keyword based on the text generation rule and the at least one target keyword.

The above is an illustrative scheme of an apparatus for generating a live-streaming content of the present embodiment. It should be noted that a technical scheme of the apparatus for generating live-streaming content belongs to the same idea as a technical scheme of the above-mentioned method for generating live-streaming content. For details not described in detail in the technical scheme of the apparatus for generating the live-streaming content, reference may be made to the description of the technical scheme of the above-mentioned method for generating live-streaming content.

Figure 5:
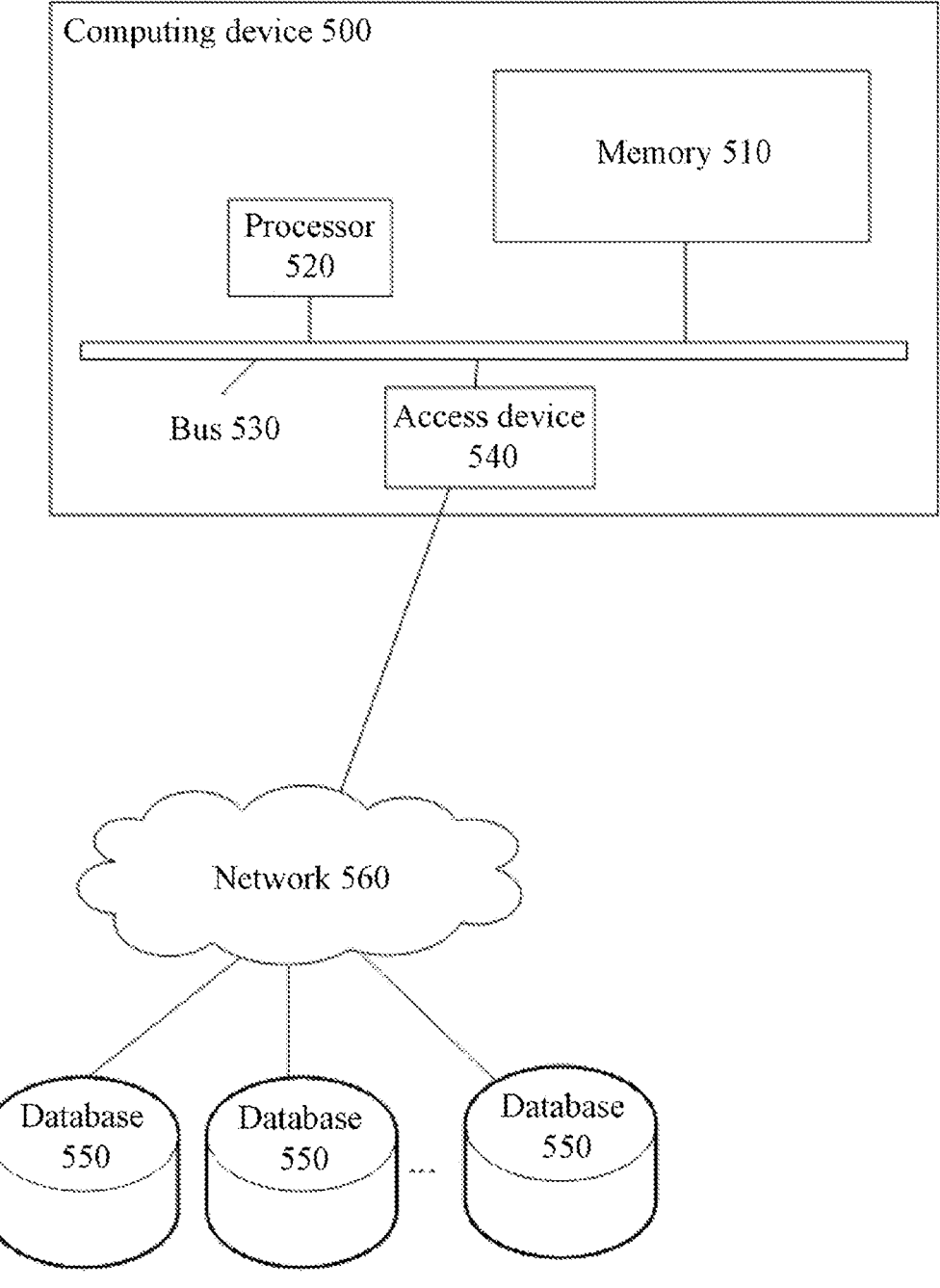
FIG. 5 is a structural block diagram of a computing device provided by an embodiment of the present application.

FIG. 5 shows a structural block diagram of a computing device 500 provided according to an embodiment of the present application. Components of the computing device 500 include but are not limited to a memory 510 and a processor 520. The processor 520 is connected to the memory 510 via bus 530, and a database 550 is configured to store data.

The computing device 500 also includes an access device 540 that enables the computing device 500 to communicate over one or more networks 560. Examples of these networks include a combination of communication networks of Public Switched Telephone Networks (PSTN), Local Area Networks (LAN), Wide Area Networks (WAN), Personal Area Networks (PAN), or such as the Internet. The access device 540 may include one or more of any type of network interface (e.g., Network Interface Card (NIC)) of wired or wireless, such as IEEE802.11 Wireless Local Area Network (WLAN) wireless interface, Worldwide Interoperability for Microwave Access (Wi-MAX) interface, Ethernet interface, Universal Serial Bus (USB) interface, cellular network interface, Bluetooth interface, Near Field Communication (NFC) interface, and so on.

In an embodiment of the present application, the above components of the computing device 500 and other components not shown in FIG. 5 may also be connected to each other, for example by a bus. It should be understood that the structural block diagram of the computing device shown in FIG. 5 is for example purposes only and is not a limitation of the scope of the present application. Persons skilled in the art may add or replace other parts as needed.

The computing device 500 can be any type of stationary or mobile computing device, including mobile computers or mobile computing devices (e.g., tablets, personal digital assistants, laptop computers, notebook computer, netbooks, etc.), mobile phones (e.g., smartphones), wearable computing devices (e.g., smart watches, smart glasses, etc.) or other types of mobile devices, or stationary computing devices such as desktop computers or PCs. The computing device 500 can also be a mobile or stationary server.

The processor 520 is configured to execute the following computer-executable instruction, when the computer-executable instruction is executed by the processor, the steps of the above-mentioned method for generating live-streaming content are implemented.

The above is an illustrative scheme of a computing device of the present embodiment. It should be noted that a technical scheme of the computing device belongs to the same idea as a technical scheme of the above-mentioned method for generating live-streaming content. For details not described in detail in the technical scheme of the computing device, please refer to the description of the technical scheme of the above-mentioned method for generating live-streaming content.

An embodiment of the present application further provides a computer-readable storage medium that stores computer-executable instructions, when the computer-executable instruction is executed by a processor, the steps of the above-mentioned method for generating live-streaming content are implemented.

The above is an illustrative scheme of a computer readable storage medium of the present embodiment. It should be noted that a technical scheme of the storage medium belongs to the same idea as a technical scheme of the above-mentioned method for generating live-streaming content. For details not described in detail in the technical scheme of the storage medium, reference may be made to the description of the technical scheme of the above-mentioned method for generating live-streaming content.

An embodiment of the present application also provides a computer program, where a computer is caused to perform the steps of the above-mentioned method for generating live-streaming content when the computer program is executed on the computer.

The above is an illustrative scheme of a computer program of the present embodiment. It should be noted that a technical scheme of the computer program belongs to the same idea as a technical scheme of the above-mentioned method for generating live-streaming content. For details not described in detail in the technical scheme of the computer program, please refer to the description of the technical scheme of the above-mentioned method for generating live-streaming content.

Specific embodiments of the present application are described above. Other embodiments are within the scope of the attached claims. In some cases, actions or steps described in the claim may be performed in a different sequence than in the embodiment and still achieve the desired result. In addition, the process described in the accompanying diagram does not necessarily require a specific sequence or sequential sequence to achieve the desired result. In some embodiments, multitasking and parallel processing are also possible or may be advantageous.

The computer instruction includes a computer program code, the computer program code can be source code form, object code form, executable file or some intermediate form. The computer readable medium may include: any entity or apparatus, recording medium, U drive, portable hard drive, magnetic disk, optical disc, computer memory, Read-Only Memory (ROM, Read-Only Memory), Random Access Memory (RAM, Random Access Memory), electric carrier signal, telecommunication signal and software distribution medium, etc., which capable of carrying the computer program code. It should be noted that the contents of the computer readable medium may be appropriately increased or decreased according to the requirements of the legislation and patent practice in the jurisdiction, for example, in some jurisdictions, according to the legislation and patent practice, the computer readable medium does not include electric carrier signals and telecommunications signals.

It should be noted that, for the purpose of simple description, each of the above-mentioned embodiments of the method is expressed as a series of combinations of actions, but those skilled in the art should be aware that the embodiments of the present application are not limited by the sequence of actions described, because according to the embodiments of the present application, some steps may be performed in a different sequence or simultaneously. Secondly, persons skilled in the art should also be aware that the embodiments described in the present application are preferred embodiments, and that the actions and modules involved are not necessarily necessary for the embodiments of the present application.

In the above embodiments, the description of each embodiment has its own emphasis, and the part not detailed in one embodiment can be referred to the relevant description of other embodiments.

The above disclosed preferred embodiments of the present application are intended only to assist in the elaboration of the present application. The above-mentioned embodiments do not elaborate on all the details and do not limit the present disclosure to the specific embodiments described. Obviously, according to the contents of the embodiments of the present application, many modifications and changes can be made. These embodiments are selected and specifically described in the present application for the purpose of better explaining the principle and practical application of the embodiments of the present application, so that technicians in the technical field can better understand and use the present application. The present application is limited only by the claims and their full scope and equivalents.

The invention claimed is:

1. A method for generating live-streaming content, applied to a virtual live-streaming control system and comprising:

using a virtual character to carry out live-streaming for a live-streaming theme, wherein the live-streaming theme corresponds to a live-streaming theme text with a first narrative style;

driving the virtual character to broadcast the live-streaming theme text in a first broadcasting style;

prompting a viewing user of theme interaction information related to the live-streaming theme through the virtual character;

acquiring multiple pieces of theme feedback information related to the theme interaction information of the viewing user;

generating at least one target keyword based on the multiple pieces of theme feedback information;

acquiring a live-streaming interactive text with a second narrative style associated with the at least one target keyword, wherein the second narrative style is different from the first narrative style; and driving the virtual character to broadcast the live-streaming interactive text in a second broadcasting style, wherein the second broadcasting style is different from the first broadcasting style.

2. The method for generating live-streaming content according to claim 1, further comprising:

determining a keyword related to the live-streaming theme; and inputting the keyword into a text generation model for processing, and generating the live-streaming interactive text with the second narrative style.

3. The method for generating live-streaming content according to claim 2, wherein the text generation model is trained in the following ways:

acquiring an initial theme text related to the live-streaming theme; and taking the initial theme text as a training sample, inputting the initial theme text into a text generation model to be trained for training, and obtaining the text generation model.

4. The method for generating live-streaming content according to claim 3, further comprising:

generating an intermediate theme text by inputting the keyword into the text generation model for processing;

acquiring a reference theme text generated by the viewing user adjusting the intermediate theme text; and inputting the reference theme text into the text generation model for processing to iteratively optimize the text generation model.

5. The method for generating live-streaming content according to claim 1, further comprising:

adding the live-streaming interactive text to a target playback position in a live-streaming waiting queue corresponding to the live-streaming theme according to a preset broadcast rule.

6. The method for generating live-streaming content according to claim 1, further comprising:

setting a target broadcast time interval;

determining a target broadcasting style corresponding to the target broadcast time interval in a case that a current live-streaming time is determined to reach a start time point of the target broadcast time interval; and performing the step of prompting the viewing user of the theme interaction information related to the live-streaming theme through the virtual character in a case that the target broadcasting style is determined to be the second broadcasting style.

7. The method for generating live-streaming content according to claim 6, wherein the prompting the viewing user of the theme interaction information related to the live-streaming theme through the virtual character comprises:

prompting the viewing user of a question to be fed back related to the live-streaming theme through the virtual character; or, prompting the viewing user of a question to be fed back related to the live-streaming theme and at least two text answers to be fed back or at least two answer controls to be clicked corresponding to the question to be fed back through the virtual character.

8. The method for generating live-streaming content according to claim 7, wherein the acquiring the multiple pieces of theme feedback information related to the theme interaction information of the viewing user comprises:

acquiring theme feedback information submitted by the viewing user by clicking a target answer control to be clicked, wherein the target answer control to be clicked is one of the at least two answer controls to be clicked.

9. The method for generating live-streaming content according to claim 1, wherein the prompting the viewing user of the theme interaction information related to the live-streaming theme through the virtual character comprises:

waiting for the multiple pieces of theme feedback information of the viewing user within a preset time, and at the same time broadcasting a preset transition content related to the theme interaction information through the virtual character.

10. The method for generating live-streaming content according to claim 1, wherein the acquiring the multiple pieces of theme feedback information related to the theme interaction information of the viewing user comprises:

acquiring multiple text comment information of the viewing user related to the theme interaction information;

accordingly, the generating the at least one target keyword based on the multiple pieces of theme feedback information comprises:

acquiring at least one target keyword related to the live-streaming theme by performing keyword extracting on the multiple text comment information.

11. The method for generating live-streaming content according to claim 1, wherein the acquiring the live-streaming interactive text with the second narrative style associated with the at least one target keyword comprises:

determining a text generation rule of the live-streaming interactive text with the second narrative style; and generating the live-streaming interactive text with the second narrative style associated with the at least one target keyword based on the text generation rule and the at least one target keyword.

12. A computing device, comprising:

a memory and a processor;

wherein the memory is configured to store computer executable instructions, and the processor is configured to execute the computer executable instructions, the processor, when executing the computer executable instructions, is configured to:

use a virtual character to carry out live-streaming for a live-streaming theme, wherein the live-streaming theme corresponds to a live-streaming theme text with a first narrative style;

drive the virtual character to broadcast the live-streaming theme text in a first broadcasting style;

prompt a viewing user of theme interaction information related to the live-streaming theme through the virtual character;

acquire multiple pieces of theme feedback information related to the theme interaction information of the viewing user;

generate at least one target keyword based on the multiple pieces of theme feedback information;

acquire a live-streaming interactive text with a second narrative style associated with the at least one target keyword, wherein the second narrative style is different from the first narrative style; and drive the virtual character to broadcast the live-streaming interactive text in a second broadcasting style, wherein the second broadcasting style is different from the first broadcasting style.

13. The computing device according to claim 12, wherein the processor is configured to:

determine a keyword related to the live-streaming theme; and input the keyword into a text generation model for processing, and generate the live-streaming interactive text with the second narrative style.

14. The computing device according to claim 13, wherein the text generation model is trained in the following ways:

acquiring an initial theme text related to the live-streaming theme; and taking the initial theme text as a training sample, inputting the initial theme text into a text generation model to be trained for training, and obtaining the text generation model.

15. The computing device according to claim 14, wherein the processor is configured to:

generate an intermediate theme text by inputting the keyword into the text generation model for processing;

acquire a reference theme text generated by the viewing user adjusting the intermediate theme text; and input the reference theme text into the text generation model for processing to iteratively optimize the text generation model.

16. The computing device according to claim 12, wherein the processor is configured to:

add the live-streaming interactive text to a target playback position in a live-streaming waiting queue corresponding to the live-streaming theme according to a preset broadcast rule.

17. The computing device according to claim 12, wherein the processor is configured to:

set a target broadcast time interval;

determine a target broadcasting style corresponding to the target broadcast time interval in a case that a current live-streaming time is determined to reach a start time point of the target broadcast time interval; and perform the step of prompting the viewing user of the theme interaction information related to the live-streaming theme through the virtual character in a case that the target broadcasting style is determined to be the second broadcasting style.

18. The computing device according to claim 17, wherein the processor is configured to:

prompt the viewing user of a question to be fed back related to the live-streaming theme through the virtual character; or, prompt the viewing user of a question to be fed back related to the live-streaming theme and at least two text answers to be fed back or at least two answer controls to be clicked corresponding to the question to be fed back through the virtual character.

19. The computing device according to claim 12, wherein the processor is configured to:

wait for the multiple pieces of theme feedback information of the viewing user within a preset time, and at the same time broadcast a preset transition content related to the theme interaction information through the virtual character.

20. A non-transitory computer-readable storage medium, wherein the computer-readable storage medium stores computer executable instructions, a processor, when executing the computer executable instructions, is configured to:

use a virtual character to carry out live-streaming for a live-streaming theme, wherein the live-streaming theme corresponds to a live-streaming theme text with a first narrative style;

drive the virtual character to broadcast the live-streaming theme text in a first broadcasting style;

prompt a viewing user of theme interaction information related to the live-streaming theme through the virtual character;

acquire multiple pieces of theme feedback information related to the theme interaction information of the viewing user;

generate at least one target keyword based on the multiple pieces of theme feedback information;

acquire a live-streaming interactive text with a second narrative style associated with the at least one target keyword, wherein the second narrative style is different from the first narrative style; and drive the virtual character to broadcast the live-streaming interactive text in a second broadcasting style, wherein the second broadcasting style is different from the first broadcasting style.

* * * * *